(12) United States Patent
Muskopf

(10) Patent No.: US 10,321,762 B2
(45) Date of Patent: Jun. 18, 2019

(54) WALL ANCHORING ASSEMBLY

(71) Applicant: Thomas Omer Muskopf, Orlando, FL (US)

(72) Inventor: Thomas Omer Muskopf, Orlando, FL (US)

(*) Notice: Subject to any disclaimer, the term of this patent is extended or adjusted under 35 U.S.C. 154(b) by 0 days.

(21) Appl. No.: 15/666,940

(22) Filed: Aug. 2, 2017

(65) Prior Publication Data

US 2018/0042379 A1    Feb. 15, 2018

Related U.S. Application Data

(60) Provisional application No. 62/372,399, filed on Aug. 9, 2016.

(51) Int. Cl.
  *F16B 12/24* (2006.01)
  *A47B 97/00* (2006.01)
  *A47B 95/00* (2006.01)
  *F16B 12/36* (2006.01)

(52) U.S. Cl.
  CPC ............. *A47B 97/00* (2013.01); *A47B 95/00* (2013.01); *A47B 2097/008* (2013.01); *F16B 12/24* (2013.01); *F16B 12/36* (2013.01)

(58) Field of Classification Search
  USPC ... 248/220.21, 220.22, 221.11, 224.7, 224.8, 248/229.1, 551; 403/355, 356, 361, 345, 403/167, 168, 337, DIG. 13
  See application file for complete search history.

(56) References Cited

U.S. PATENT DOCUMENTS

| | | | | |
|---|---|---|---|---|
| 2,248,410 A * | 7/1941 | Moeller | ................ | A47J 45/02 248/224.51 |
| 3,552,702 A * | 1/1971 | Springer | ................ | G09F 7/18 248/316.7 |
| 3,926,529 A * | 12/1975 | Brooks | ................ | F16B 12/24 16/270 |
| 4,909,464 A * | 3/1990 | Levine | ................ | G09F 7/22 16/284 |
| 5,467,571 A | 11/1995 | Khatibi | | |
| 5,709,500 A * | 1/1998 | Mizelle | ................ | A47C 4/02 16/386 |
| 6,824,111 B1 * | 11/2004 | Hugli | ................ | B60M 1/12 248/200 |
| 7,788,785 B2 | 9/2010 | Platt | | |
| 2016/0010793 A1 | 1/2016 | McCullough et al. | | |

* cited by examiner

*Primary Examiner* — Alfred J Wujciak
(74) *Attorney, Agent, or Firm* — Dunlap Bennett & Ludwig PLLC

(57) ABSTRACT

A wall anchoring assembly for securing furniture to a vertical support is provided. The wall anchoring assembly includes a wall anchoring mount and a furniture anchoring mount, both attach to the vertical support and the furniture, respectively, in a face to face orientation. Each anchoring mount and attachment portion provides horizontal flanges that nest so that the flanges' fastener holes align for an elongated fastener to secure the vertical support and furniture in a locked engagement.

8 Claims, 4 Drawing Sheets

WALL ANCHORING ASSEMBLY

CROSS-REFERENCE TO RELATED APPLICATION

This application claims the benefit of priority of U.S. provisional application No. 62/372,399, filed 9 Aug. 2016, the contents of which are herein incorporated by reference.

BACKGROUND OF THE INVENTION

The present invention relates to fasteners and, more particularly, a wall anchor for securing furniture to a vertical support, preventing the furniture from tipping by providing an inexpensive, lightweight and strong securement.

Furniture, especially vertically elongated furniture such as bookshelves, are prone to tipping when top heavy, which can obviously cause bodily harm. This hazard is exacerbated with the presence of children, who may enjoy climbing such furniture, thereby heightening the likelihood and severity of such an accident.

Current wall anchors are constructed out of metal, wood, or other bulky material, making such anchors unnecessarily heavy, expensive, and installation unnecessarily burdensome, resulting in a weakened fastener for such an important task.

As can be seen, there is a need for a wall anchor for securing furniture to a vertical support, preventing the furniture from tipping by providing an inexpensive, lightweight and strong securement.

SUMMARY OF THE INVENTION

In one aspect of the present invention, a wall anchoring assembly includes a wall anchoring mount having a wall anchoring flange perpendicularly joined to a wall anchoring body; a wall attachment portion having a wall attachment flange perpendicularly joined to a wall attachment body; a furniture anchoring mount having a furniture anchoring flange perpendicularly joined to a furniture anchoring body; a furniture attachment portion having a furniture attachment flange perpendicularly joined to a furniture attachment body; an attachment aperture provided in the furniture attachment body; a plurality of fastener holes, one of the plurality of fastener holes provided in each anchoring flange and attachment flange; and the anchoring mounts and attachment portion are movable to a stacked arrangement, wherein the plurality of fastener holes align, while the furniture anchoring flange protrudes through the attachment aperture.

In another aspect of the present invention, the wall anchoring assembly includes the wall anchoring mount having a first wall anchoring flange perpendicularly joined to a wall anchoring body; a second wall anchoring flange spaced apart from the first wall anchoring flange so as to define a wall attachment space; a wall attachment portion having a first wall attachment flange perpendicularly joined to a wall attachment body; an attachment aperture provided in the furniture attachment body; a second wall attachment flange spaced apart from the first wall attachment flange, wherein the wall attachment portion is dimensioned to snugly nest in the wall attachment space; a furniture anchoring mount having a first furniture anchoring flange perpendicularly joined to a furniture anchoring body; a wall scribe extending from a distal portion of the furniture anchoring flange in the same direction as the furniture anchoring flange; a furniture attachment portion having a first furniture attachment flange perpendicularly joined to a furniture attachment body; an attachment aperture provided in the furniture attachment body; a plurality of fastener holes, one of the plurality of fastener holes provided in each anchoring flange and attachment flange; the anchoring mounts and attachment portions being movable to a stacked arrangement, wherein the of plurality fastener holes align, while the furniture anchoring flange protrudes through the attachment aperture, and wherein the first anchoring flanges sandwich the first attachment flanges; and an elongated fastener having an elongated pin ending in a fastener head, wherein the elongated in is adapted and dimensioned to slide through each of the plurality of fastener holes but the fastener head is not, and wherein the elongated pin is movable between an unlocked engagement and a locked engagement slid through the plurality of fastener holes.

These and other features, aspects and advantages of the present invention will become better understood with reference to the following drawings, description and claims.

DETAILED DESCRIPTION OF THE INVENTION

Figure 1:
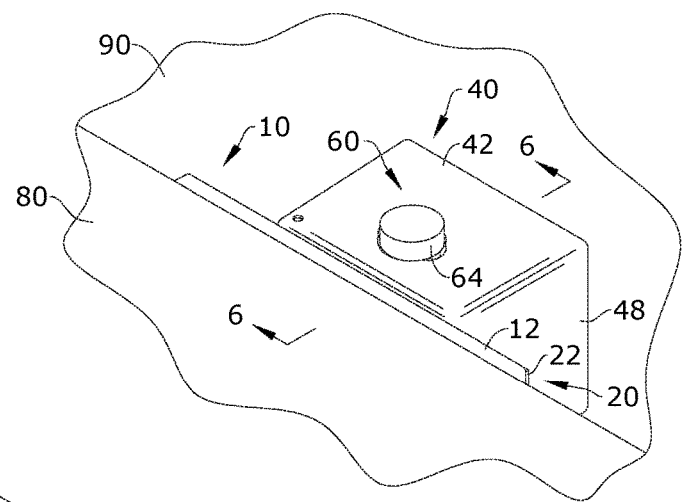
FIG. 1 is a perspective view of an exemplary embodiment of the present invention, shown in use.
Figure 2:
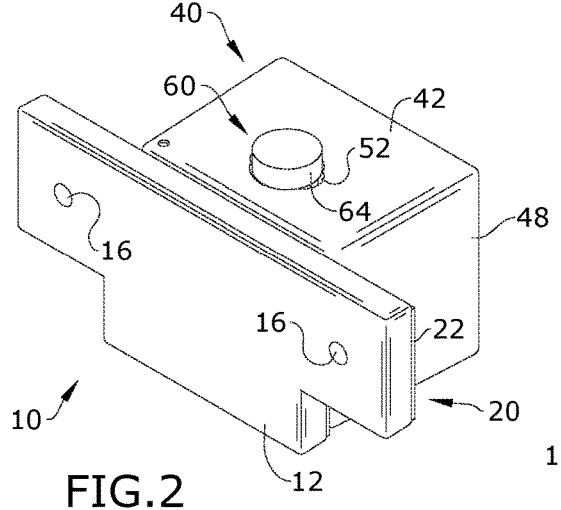
FIG. 2 is a front perspective view of an exemplary embodiment of the present invention with fasteners 70 removed for clarity.
Figure 3:
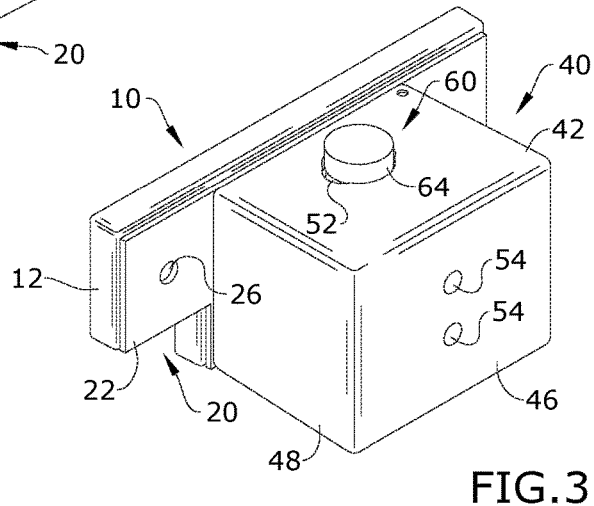
FIG. 3 is a rear perspective view of an exemplary embodiment of the present invention with fasteners 70 removed for clarity.
Figure 4:
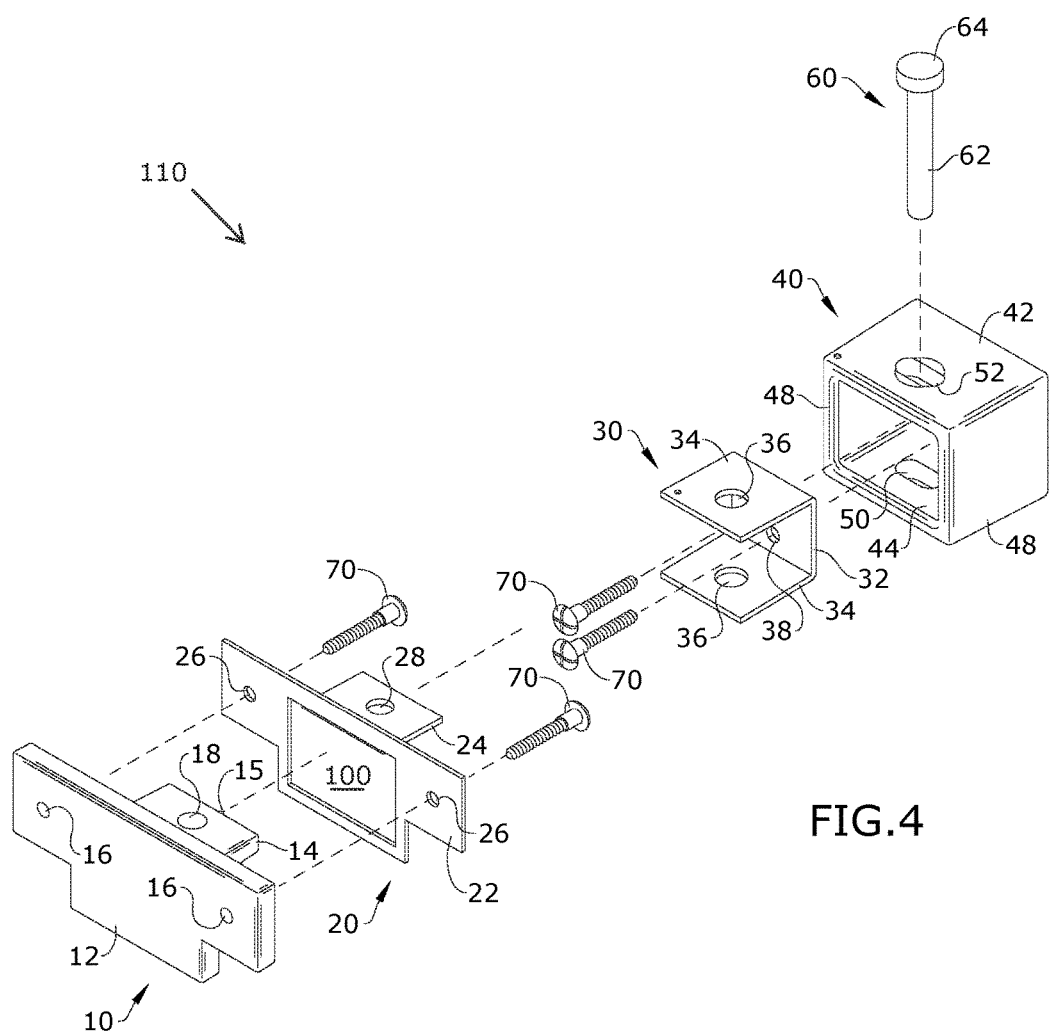
FIG. 4 is a front exploded view of an exemplary embodiment of the present invention.
Figure 5:
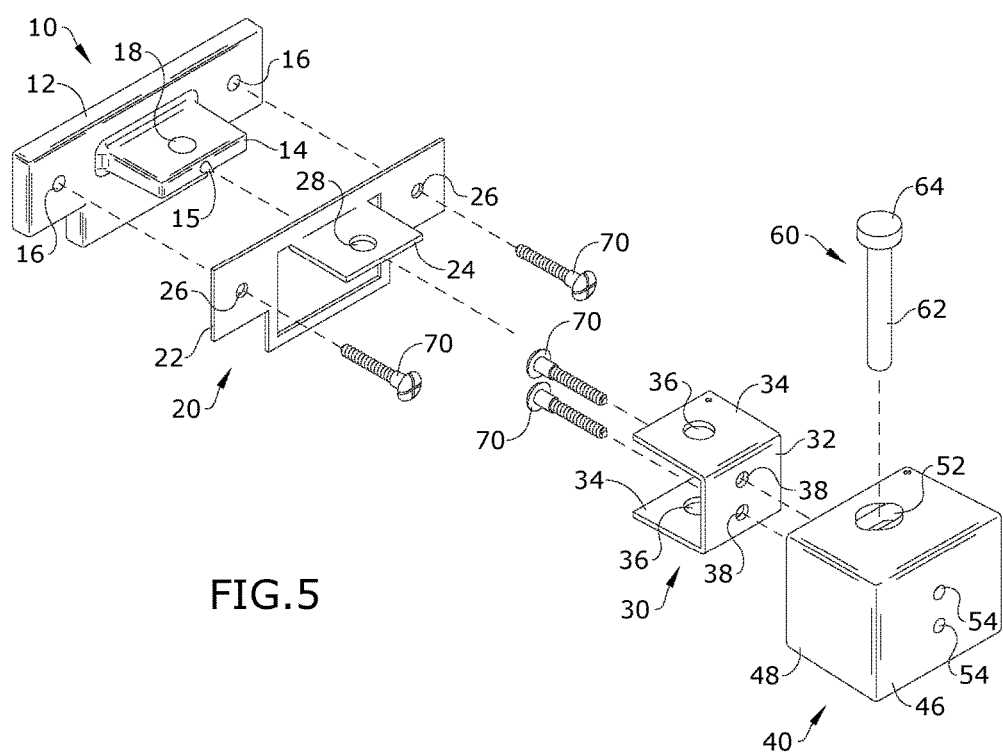
FIG. 5 is a rear exploded view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a wall anchoring assembly for securing furniture to a vertical support, preventing the furniture from tipping by providing an inexpensive, lightweight and strong securement. The wall anchoring assembly provides a wall anchoring mount and a furniture anchoring mount, both attach to the vertical support and the furniture, respectively, in a face to face orientation. Each anchoring mount and attachment portion provides horizontal flanges that nest so as the flanges' fastener holes align for an elongated fastener to secure the vertical support and furniture in a locked engagement.

Referring to FIGS. 1 through 6, the present invention may include a fastener assembly 110 providing a furniture anchoring mount 10, a wall anchoring mount 40 and a retaining assembly. The furniture anchoring mount 10 may include a planar furniture body 12 and a furniture flange 14 perpendicularly joined thereto. Said furniture body 12 having a first body hole 16 near each of its two opposing wing ends, wherein the furniture flange 14 may be disposed between each first body hole 16. A wall scribe 15 may extend from a distal end of the furniture flange 14 in the same direction that the furniture flange 14 extends. Said furniture flange 14 may have a first flange hole 18 generally centrically disposed.

The wall anchoring mount 40 may include a planar wall body 46 and two opposing upper and lower wall flanges 42 and 44 perpendicularly joined along opposing peripheral edges of the planar wall body 46. Said wall body 46 having body fastener holes 54. Said wall flanges 42 and 44 each have an upper second flange hole 52 and an aligned lower second flange hole 50, respectively. The wall body 46 and two opposing wall flanges 42 and 44 may be joined by sidewalls 48.

Figure 6:
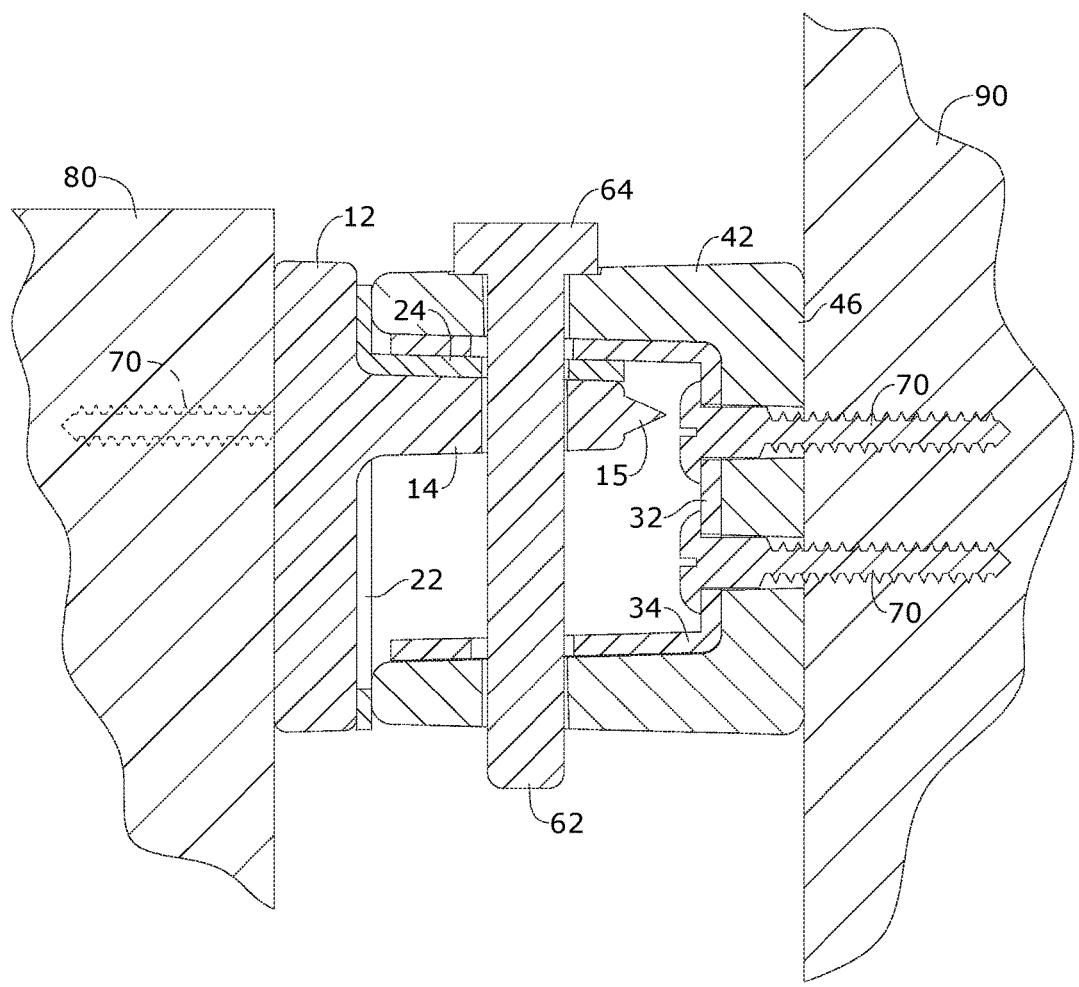
FIG. 6 is a section view of an exemplary embodiment of the present invention, taken along line 6-6 of FIG. 1.

The retaining assembly may include a wall attachment portion 30 and a furniture attachment portion 20. The wall attachment portion 30 may include a planar wall body portion 32 and two opposing wall flange portions 34 perpendicularly joined along opposing peripheral edges thereof. Said wall body portion 32 having fastener holes 38 spaced apart to align with the body fastener holes 54. Each wall flange portion 34 having a fourth flange hole 36 generally centrically disposed. The wall attachment portion 30 may be dimensioned and adapted to slide into a wall attachment space between the wall flanges 42 and 44 of the wall anchoring mount 40, as illustrated in FIG. 6.

The furniture attachment portion 20 may include a planar furniture body portion 22 and a furniture flange portion 24 perpendicularly joined thereto. Said furniture body portion 22 having a second body hole 26 near each of its two opposing wing ends, wherein the furniture flange portion 24 may be disposed between each second body holes 26. Said furniture flange portion 24 may have a third flange hole 28 generally centrically disposed. The furniture attachment portion 20 may provide an aperture 100 between the two opposing wing ends and adjacent the wall flange portion 24. The aperture 100 may be dimensioned and adapted to slidably receive the furniture flange 14 and the wall flange portions 34, wherein one of the wall flange portions 34 and the furniture flange 14 are oriented in a stacked arrangement so that the first flange hole 18, the second flange holes 52/50, the third flange hole 28, and the fourth flange holes 36 align. The retaining assembly may include an elongated connector 60 with a pin portion 62 and connector head 64, wherein the elongated pin portion 62 slides through the aligned flange holes 18, 52/50, 28 and 36 in a locked engagement, wherein the connector head 64 prevents it from sliding all the way through.

It will be apparent to those skilled in the art that the body and flange components may be designed in a variety of different volumes and geometrical configurations so long as they function in accordance with the present invention as described herein. The fastener assembly 110 may be made by plastic mold injection, additive manufacturing, and/or metal stamping.

The method of using the present invention includes the following. The fastener assembly 110 disclosed above may be provided. The user may attach the furniture anchoring mount 10 and the furniture attachment portion 20 to a piece of furniture 80 to be retained, for example a main upper joist of the furniture 80 by using conventional fasteners 70 through the first and third body holes 16, 26. The furniture anchoring mount 10 and the furniture attachment portion 20 connect in a furniture mount configuration wherein the first flange 14 protrudes through the aperture 100. Then the user may urge the wall scribe 15 of the first flange 14 against a vertical support 90 so as to provide an indent or other connection indication on the vertical support 90 the user intends on securing the furniture 80 to. The connection indication provides a guide to where the user would need to locate the cooperating wall anchoring mount 40.

The user may attach the wall anchoring mount 40 and the wall attachment portion 80 to the vertical support 90, such as a wall, to retain the piece of furniture 80 thereto, by using conventional fasteners 70 through the fastener holes 54, 38. The wall anchoring mount 40 and the wall attachment portion 80 nest in a wall mount configuration, wherein the second flange holes 52/50 and the fourth flange holes 36 align. Then the user may slide the furniture 80 so that the furniture mount configuration and wall mount configuration operative associate, wherein the elongated connector 60 is receivable through the aligned flange holes 52, 36, 28, 18, and 50, respectively from an upper direction to a lower direction. Receiving said elongated connector moves the fastener assembly 110 from an unlocked engagement to the locked engagement, preventing the furniture 80 from tipping by providing an inexpensive, lightweight and strong securement. The use of a temporary adhesive for either the furniture anchoring mount 10 or the wall anchoring mount 40 may be helpful.

It should be understood, of course, that the foregoing relates to exemplary embodiments of the invention and that modifications may be made without departing from the spirit and scope of the invention as set forth in the following claims.

What is claimed is:

1. An anchoring assembly for securing a furniture to a vertical support, comprising
 a wall anchoring mount having a top anchoring flange perpendicularly joined to a back anchoring body;
 a wall attachment portion having a top attachment flange perpendicularly joined to a back attachment body;
 a furniture anchoring mount having a furniture anchoring flange perpendicularly joined to a furniture anchoring body;
 a furniture attachment portion having a furniture attachment flange perpendicularly joined to a furniture attachment body;
 an attachment aperture provided in the furniture attachment body;
 a plurality of fastener holes, one of the plurality of fastener holes provided in each anchoring flange and attachment flange; and
 the anchoring mounts and attachment portions being movable to a nested arrangement, wherein the plurality of fastener holes align, while the furniture anchoring flange protrudes through the attachment aperture.

2. The anchoring assembly of claim 1, wherein the nested arrangement the anchoring flanges sandwich the attachment flanges.

3. The anchoring assembly of claim 1, further comprising an elongated fastener having an elongated pin ending in a fastener head, wherein the elongated in is adapted and dimensioned to slide through each of the plurality of fastener holes but the fastener head is not.

4. The anchoring assembly of claim 3, wherein the elongated pin is movable between an unlocked engagement and a locked engagement slid through the plurality of fastener holes.

5. The anchoring assembly of claim 1, further comprising:
 a second top anchoring flange spaced apart from the top anchoring flange so as to define a wall attachment space; and wherein one of the plurality of fastener holes is provided in the second top anchoring flange, wherein the wall attachment portion is dimensioned to snugly nest in the wall attachment space.

6. The anchoring assembly of claim 5, further comprising:
a second top attachment flange spaced apart from the top attachment flange, wherein one of the plurality of fastener holes is provided in the second top attachment flange.

7. The anchoring assembly of claim 1, further comprising:
a wall scribe extending from a distal portion of the furniture anchoring flange in the same direction as the furniture anchoring flange.

8. An anchoring assembly for securing a furniture to a vertical support, comprising
  a wall anchoring mount having a first top anchoring flange perpendicularly joined to a back anchoring body;
  a second anchoring flange spaced apart from the first top anchoring flange and perpendicularly to the back anchoring body so as to define a wall attachment space;
  a top attachment portion having a first top attachment flange perpendicularly joined to a back attachment body;
  an attachment aperture provided in a furniture attachment body;
  a second top attachment flange spaced apart from the first top attachment flange, wherein the back attachment portion is dimensioned to snugly nest in the wall attachment space;
  a furniture anchoring mount having a first furniture anchoring flange perpendicularly joined to a furniture anchoring body;
  a wall scribe extending from a distal portion of the furniture anchoring flange in the same direction as the furniture anchoring flange;
  a furniture attachment portion having a first furniture attachment flange perpendicularly joined to the furniture attachment body;
  a plurality of fastener holes, one of the plurality of fastener holes provided in each anchoring flange and attachment flange;
  the anchoring mounts and attachment portions being movable to a nested arrangement, wherein the of plurality fastener holes align, while the furniture anchoring flange protrudes through the attachment aperture, and wherein the first top anchoring flanges sandwich the first top attachment flanges; and
  an elongated fastener having an elongated pin ending in a fastener head, wherein the elongated in is adapted and dimensioned to slide through each of the plurality of fastener holes but the fastener head is not, and wherein the elongated pin is movable between an unlocked engagement and a locked engagement slid through the plurality of fastener holes.

* * * * *